June 9, 1959  G. PAVLINETZ  2,889,564
METHOD OF FORMING WING NUTS FROM TUBULAR STOCK
Original Filed Sept. 22, 1950  2 Sheets-Sheet 1

INVENTOR.
George Pavlinetz
BY
William G. Zalesak
ATTORNEY

June 9, 1959 — G. PAVLINETZ — 2,889,564
METHOD OF FORMING WING NUTS FROM TUBULAR STOCK
Original Filed Sept. 22, 1950 — 2 Sheets-Sheet 2

INVENTOR.
George Pavlinetz
BY William A. Zalesak
ATTORNEY

United States Patent Office 2,889,564
Patented June 9, 1959

2,889,564

METHOD OF FORMING WING NUTS FROM TUBULAR STOCK

George Pavlinetz, Carteret, N.J.

Original application September 22, 1950, Serial No. 186,149. Divided and this application July 29, 1957, Serial No. 675,521

3 Claims. (Cl. 10—86)

My invention relates to nuts, more particularly to wing nuts and a novel method of manufacturing the same.

This application is a division of my original application, Serial No. 186,149 filed September 22, 1950, now abandoned.

An object of my invention is to provide a novel wing nut of simple structure which is strong and inexpensive to manufacture.

A further object of my invention is to provide such a nut which can be made of one piece of tubing of the seamless or seam type.

A further object of my invention is to provide a strong wing nut of simple design which can be manufactured without the need for costly castings or forgings, and without the necessity of drilling or spot-welding.

Another object of my invention is to provide a simple method of manufacturing strong, novel wing nuts from seamless or seam type tubing or pipe by simple method whereby the need for expensive dies is eliminated.

These and other objects will appear hereinafter.

The novel features which I believe to be characteristic of my invention are set forth with particularity in the appended claims but the invention itself will best be understood by reference to the following description taken in connection with the accompanying drawing, in which:

Figure 6:
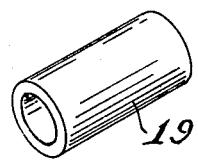
Figure 3:
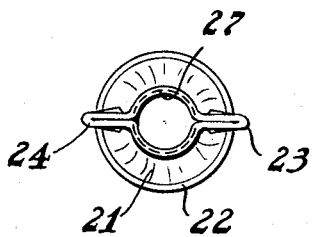
Fig. 3 is a top or plan view of Fig. 1.
Figure 7:
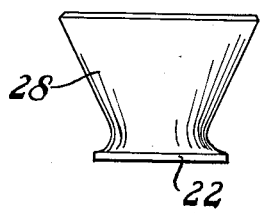
Figure 1:
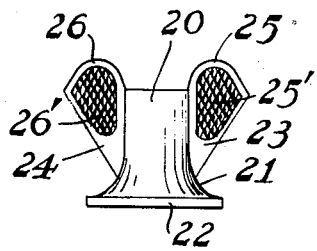
Fig. 1 is a front elevation of a wing nut made according to my invention.
Figure 2:
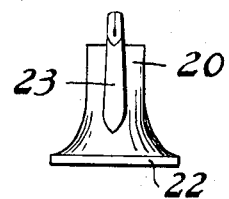
Fig. 2 is a side view of Fig. 1.
Figure 8:
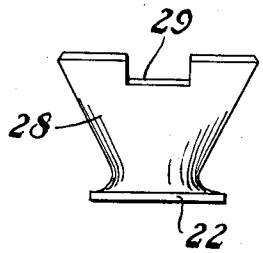
Figure 4:
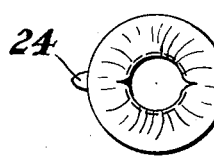
Fig. 4 is a bottom view of Fig. 1.
Figure 9:
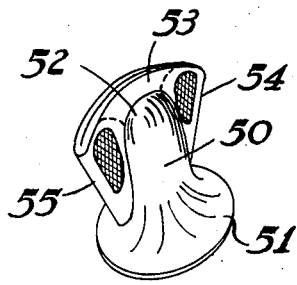
Figure 10:
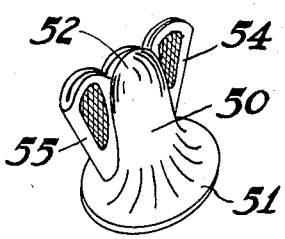
Figure 11:
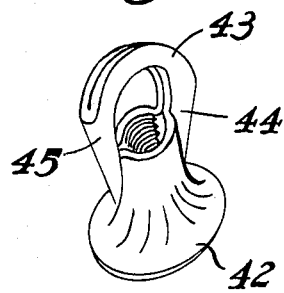
Figure 14:
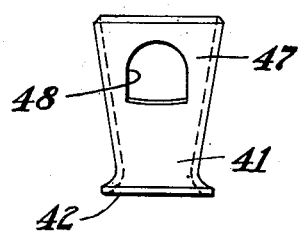
Figure 12:
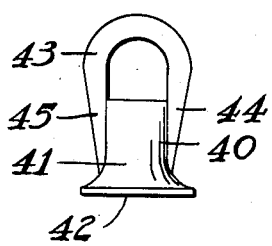
Figure 13:
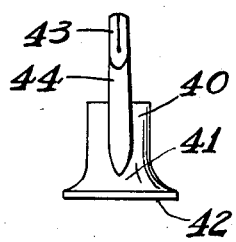
Figure 17:
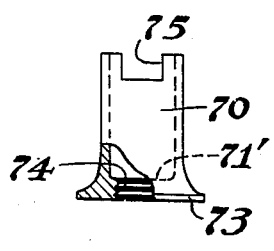
Figure 15:
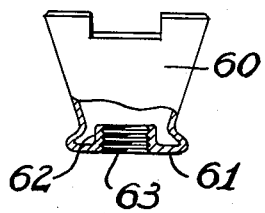
Figure 16:
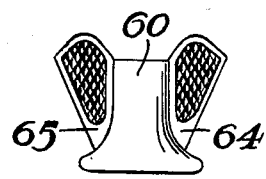
Figure 18:
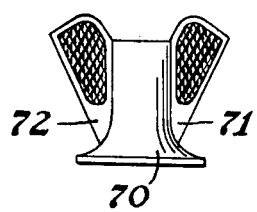

Figs. 6, 7, and 8 illustrate steps in the manufacture of a wing nut made according to my invention;

Fig. 9 is a perspective of a modification of the wing nut shown in Fig. 1 partially completed;

Fig. 10 is a perspective of the finished nut shown in Fig. 9;

Fig. 11 illustrates a perspective of a still further modification of a wing nut made according to my invention;

Fig. 12 is a front elevation of the wing nut shown in Fig. 11;

Fig. 13 is a side view of the wing nut shown in Fig. 12;

Fig. 14 illustrates a step in the manufacture of the nut shown in Figs. 12 and 13;

Fig. 15 is a perspective of a still further modification of a nut made according to my invention, partially completed and partially in section;

Fig. 16 is a front elevation of the completed nut shown in Fig. 15;

Fig. 17 is a side elevation of another modification partially in section of a nut made according to my invention;

Fig. 18 is a side elevation of the completed nut shown in Fig. 17; and

Figure 19:
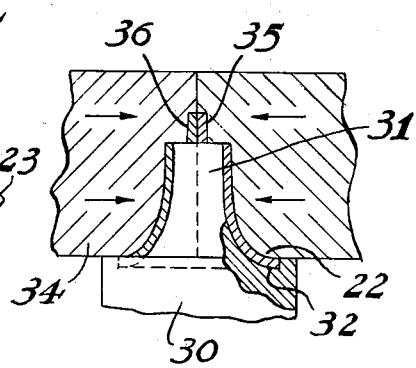

Fig. 19 is a side elevation partially in section of the die apparatus made according to my invention for making a nut according to my invention.

Figure 5:
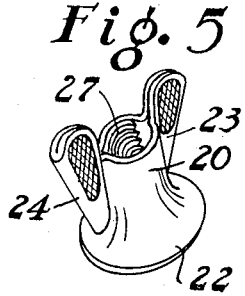
Fig. 5 is a perspective of the wing nut shown in Fig. 1.

Referring to the drawing, particularly Figs. 1 to 4 inclusive, a nut made according to my invention includes the tubular portion 20 flared downwardly and outwardly at 21 and terminates in a wide, flat base having a flange 22. Extending longitudinally of the nut and from the upper end thereof are a pair of oppositely disposed wings or ear-shaped members 23 and 24 curved along their edges at 25' and 26' and provided with the knurled or routed surfaces 25 and 26 to facilitate handling. It will be observed that this nut is a single integrally formed structure which is threaded, as at 27, as shown in Fig. 5.

This nut may be made from a single desired predetermined length of seamless or seam-type tubing 19 as shown in Fig. 6 which as a first step is flared downwardly and outwardly, as shown in Fig. 7 and terminates in a flat flange base 22 to provide a large bearing surface which is particularly suitable where the nut is used on soft material or over slotted apertures. The upper end is then flared upwardly and outwardly into a conical shape 28. It is obvious that either end could be first formed or both ends flared simultaneously. The upper end 28 of the tubular portion of the member 19 is then provided with oppositely disposed rectangular shaped slots or recesses 29 for purposes to be described.

The shaped member is then ready to be placed within the forming dies shown in Fig. 19. The die apparatus comprises a base 30 having thereon the male form 31 which is round and elongated and flares outwardly toward its bottom having a concave surface. Surrounding the base is an annular depression 32 which receives the flange 22 of the form shown in Fig. 8. The upwardly and outwardly flared portion 28 is received within the registering depressions 35 and 36, the recesses 29 being positioned so that end portions adjacent thereto are received within die portions 35 and 36.

When the dies are squeezed toward each other, a collapsing action of the upper flared portion 28 is created. The upper flared portion is collapsed about the upper part 31 of the male die or form 30.

Integral wings 25 and 26 connected to the vertical elongated sleeve portion 20 has the result of this collapsing operation. The wing portions which flow out of the die with sharp edges are trimmed to a suitable esthetic shape. Routed gripping surfaces 25' and 26' are produced at the same time.

The tubular sleeve portion 20 located between the wings is threaded internally. The threads 27 are produced by tapping or by squeezing about a threaded male form 30. By shaping, as shown, a long threaded sleeve results, since the sleeve portion is comparatively long.

It will thus be seen by means of the method which I have devised that welding is entirely eliminated as well as drilling and that simple flaring and squeezing operations are all that are required for making a wing nut of the design shown in Figs. 1 to 5, inclusive.

Other forms of my invention may be produced in like fashion. For example, in Figs. 12 and 13 I show a wing nut in which the tubular portion 40 is flared outwardly and downwardly at 41 to terminate in a flange 42. The wing portions 44 and 45 are extended and connected together by the loop 43. This loop may serve as a stop member to limit the movement of the nut onto a screw, and adds strength.

As best shown in Fig. 14, which shows a step in the formation of the nut shown in Figs. 12 and 13, a tube may be flared outwardly and upwardly as at 47 in addition to being flared outwardly at its bottom at 41 to provide the flange 42. In this case to provide the loop, oppositely disposed apertures 48 are formed in the upwardly and outwardly flared portion 47 of the tubular member, which portion is then squeezed by appropriate dies and trimmed to provide the loop 43. It may then be threaded as shown in Fig. 11.

In Fig. 9 I show a still further modification of a nut made according to my invention in which no apertures or recesses have been provided so that the tubular portion 50 is outwardly flared at its bottom and terminates in the flange 51 and is closed at its upper end 52, wing portions 54 and 55 terminating in the loop or rib portion 53 integral with the closed top. In Fig. 10 I show the finished nut with part of rib 53 removed to provide completed wings 54 and 55.

In Fig. 18 I show a modification comprising a body portion 70 having the wing elements 71 and 72. This form is made from a machined tubing 70 shown in Fig. 17, terminating in the flange 73 and being threaded in the inwardly extending flange portion 71' which is slightly thicker than flange 71 external of the nut at 72. Oppositely disposed rectangular recesses 75 are provided as shown, either before or after flaring, so that when formed, the portions of the tubing on either side thereof provide the wings 71 and 72.

In Fig. 16 I show a still further modification of my invention which is made from a tubing which is spread outwardly and collapsed back upon itself to form a re-entrant portion. This is best seen in Fig. 15 where the tubular member is flared outwardly at 60 as previously but in which its lower end is closed at 61 and provided with a re-entrant sleeve portion 62 threaded at 63. The upper end 60' of the tubular member is also internally threaded.

While certain specific embodiments have been illustrated and described, it will be understood that various changes and modifications may be made therein without departing from the spirit and scope of the invention.

I claim:

1. The method of forming a wing nut from tubing including the steps of sharply flaring one end of an elongated piece of tubing to provide a flanged base, flaring the other end of said tubing along substantially its entire length into a conical shape, notching the body of said tubing on opposite sides of the end of said last flared portion of said tubing, squeezing the tubing longitudinally of said last flared portion on opposite sides of the recessed portions of said last flared portion and limiting inward movement of the portions between said squeezed portions providing wing portions of increasing width toward the end of the tubing on opposite sides of a substantially cylindrical portion and threading the interior of said tubing.

2. The method of forming a wing nut from tubing including the steps of sharply flaring one end of an elongated piece of tubing to provide a flanged base, flaring the other end of said tubing along substantially its entire length into a conical shape, squeezing portions of the tubing longitudinally on opposite sides of said last flared portion and limiting inward movement of the portions thereby between said squeezed portions providing wing portions on the opposite sides of a substantially cylindrical portion, and threading the interior of said tubing.

3. The method of forming a one piece wing nut from tubing including the steps of cutting tubing to predetermined lengths, sharply flaring one end of a cut length to provide a base, flaring the other end of said length of tubing along substantially its entire length into a conical shape, notching the body of said tubing on opposite sides of the end of said last flared portion of said length of tubing and squeezing the tubing longitudinally of said last portion on opposite sides of the recessed portions of said last portion and spaced from the longitudinal axis of the flared portion while limiting inward movement thereof to provide a cylindrical tubular portion and wing portions increasing in width toward the end of said tubing for said nut, and threading the interior of said tubular portions.

References Cited in the file of this patent
UNITED STATES PATENTS

| | | |
|---|---|---|
| 1,061,176 | Hart | May 6, 1913 |
| 1,088,641 | Webster | Feb. 24, 1914 |
| 1,106,082 | Crane | Aug. 4, 1914 |
| 1,309,616 | Eisler | July 15, 1919 |
| 1,456,215 | Brightman | May 22, 1923 |
| 1,564,944 | Colby | Dec. 8, 1925 |
| 1,773,146 | Kellogg | Aug. 19, 1930 |
| 2,279,388 | Cox | Apr. 14, 1942 |